United States Patent
Chritz et al.

(10) Patent No.: US 11,190,441 B2
(45) Date of Patent: Nov. 30, 2021

(54) SYSTEM FOR OPTIMIZING ROUTING OF COMMUNICATION BETWEEN DEVICES AND RESOURCE REALLOCATION IN A NETWORK

(71) Applicant: MICRON TECHNOLOGY, INC., Boise, ID (US)

(72) Inventors: Jeremy Chritz, Seattle, WA (US); David Hulton, Seattle, WA (US); John Schroeter, Bainbridge Island, WA (US); John Watson, Edgewood, WA (US)

(73) Assignee: MICRON TECHNOLOGY, INC., Boise, ID (US)

( * ) Notice: Subject to any disclaimer, the term of this patent is extended or adjusted under 35 U.S.C. 154(b) by 31 days.

(21) Appl. No.: 16/709,033

(22) Filed: Dec. 10, 2019

(65) Prior Publication Data
US 2020/0112506 A1    Apr. 9, 2020

Related U.S. Application Data

(62) Division of application No. 15/647,676, filed on Jul. 12, 2017, now Pat. No. 10,516,606.

(51) Int. Cl.
*H04L 12/721* (2013.01)
*H04L 12/715* (2013.01)
(Continued)

(52) U.S. Cl.
CPC .............. *H04L 45/44* (2013.01); *H04L 45/12* (2013.01); *H04L 45/124* (2013.01); *H04L 45/04* (2013.01);
(Continued)

(58) Field of Classification Search
CPC ....... H04L 45/44; H04L 45/12; H04L 45/124; H04L 45/14; H04L 45/04; H04L 45/122; H04L 45/22
See application file for complete search history.

(56) References Cited

U.S. PATENT DOCUMENTS 5,905,873 A    5/1999   Hartmann et al.
6,047,002 A    4/2000   Hartmann et al.
(Continued)

FOREIGN PATENT DOCUMENTS

CN    103457849 A    12/2013
CN    106464593 A    2/2017
(Continued)

OTHER PUBLICATIONS

PCT Application No. PCT/US2018/041695, titled "System for Optimizing Routing of Communication Between Devices and Resource Reallocation in a Network" filed on Jul. 11, 2018, pp. all.

(Continued)

*Primary Examiner* — Peter P Chau
(74) *Attorney, Agent, or Firm* — Dorsey & Whitney LLP

(57) ABSTRACT

A device comprising a plurality of antennas operable to transmit and receive communication packets via a plurality of communication protocols and an integrated circuit chip coupled to the plurality of antennas. The integrated circuit chip comprises a first and a second plurality of processing elements. The first plurality of processing elements operable to receive communication packets via a first one of a plurality of communication protocols and process an optimal route. The second plurality of processing elements communicatively coupled to the first plurality of processing elements and operable to determine the optimal route to transmit the communication packets from a source device to a destination device based, at least in part, on transmission characteristics associated with at least one of the source or destination devices.

10 Claims, 8 Drawing Sheets

(51) Int. Cl.
*H04L 12/733* (2013.01)
*H04L 12/707* (2013.01)

(52) U.S. Cl.
CPC ............ *H04L 45/122* (2013.01); *H04L 45/14* (2013.01); *H04L 45/22* (2013.01)

(56) References Cited

U.S. PATENT DOCUMENTS

| | | |
|---|---|---|
| 6,950,394 B1 | 9/2005 | Chou et al. |
| 7,328,270 B1 | 2/2008 | Reents et al. |
| 7,573,885 B1 * | 8/2009 | Dykeman ............... H04L 45/00 370/216 |
| 8,472,372 B1 | 6/2013 | Dulai et al. |
| 8,811,422 B2 | 8/2014 | Georgiou et al. |
| 10,511,353 B2 | 12/2019 | Chritz |
| 10,516,606 B2 | 12/2019 | Chritz et al. |
| 2002/0035633 A1 | 3/2002 | Bose et al. |
| 2003/0067894 A1 | 4/2003 | Schmidt |
| 2004/0071164 A1 | 4/2004 | Baum |
| 2004/0218548 A1 | 11/2004 | Kennedy et al. |
| 2004/0252643 A1 | 12/2004 | Joshi |
| 2006/0098608 A1 | 5/2006 | Joshi |
| 2007/0195768 A1 | 8/2007 | Kanazawa et al. |
| 2009/0268668 A1 | 10/2009 | Tinnakornsrisuphap et al. |
| 2010/0027418 A1 | 2/2010 | Rodrig |
| 2010/0100934 A1 | 4/2010 | Mejdrich et al. |
| 2011/0138259 A1 | 6/2011 | Tan et al. |
| 2012/0082171 A1 | 4/2012 | Georgiou et al. |
| 2012/0087377 A1 * | 4/2012 | Lai ...................... H04L 45/04 370/427 |
| 2014/0122560 A1 | 5/2014 | Ramey et al. |
| 2014/0213256 A1 | 7/2014 | Meylan et al. |
| 2014/0289303 A1 | 9/2014 | Tarricone et al. |
| 2016/0021627 A1 | 1/2016 | Elkin et al. |
| 2016/0066788 A1 | 3/2016 | Tran et al. |
| 2016/0119775 A1 | 4/2016 | Karaoguz |
| 2016/0150459 A1 | 5/2016 | Patil et al. |
| 2017/0116154 A1 | 4/2017 | Palmer et al. |
| 2017/0201927 A1 | 7/2017 | Kobayashi |
| 2018/0007042 A1 | 1/2018 | Weizman |
| 2019/0020382 A1 | 1/2019 | Chritz |
| 2019/0020383 A1 | 1/2019 | Chritz |
| 2019/0020581 A1 | 1/2019 | Chritz |
| 2020/0067571 A1 | 2/2020 | Chritz |

FOREIGN PATENT DOCUMENTS

| | | |
|---|---|---|
| EP | 3047609 A1 | 7/2016 |
| WO | 2016197004 A2 | 12/2016 |
| WO | 2019014363 A1 | 1/2019 |

OTHER PUBLICATIONS

U.S. Appl. No. 16/107,796 titled "System for Optimizing Routing of Communication Between Devices and Resource Reallocation in a Network", filed Aug. 21, 2018, pp. all.

U.S. Appl. No. 15/647,676, entitled "System for Optimizing Routing of Communication Between Devices and Resource Reallocation in a Network", filed Jul. 12, 2017, pp. all.

U.S. Appl. No. 15/726,281, entitled "System for Optimizing Routing of Communication Between Devices and Resource Reallocation in a Network", filed Oct. 5, 2017, pp. all.

U.S. Appl. No. 16/671,111 titled "System for Optimizing Routing of Communication Between Devices and Resource Reallocation in a Network" filed Oct. 31, 2019, pp. all.

International Search Report and Written Opinion of the International Searching Authority for PCT Application No. PCT/US2018/041695 dated Nov. 29, 2018, pp. all.

English translation of Office Action for KR Application No. 10-2020-7003154, dated Feb. 1, 2021, pp. all.

Extended European Search Report for EP Application No. 18331358.9, dated Feb. 16, 2021, pp. all.

CN Office Action dated Jun. 2, 2021 for CN Application No. 201880052702.0.

* cited by examiner

SYSTEM FOR OPTIMIZING ROUTING OF COMMUNICATION BETWEEN DEVICES AND RESOURCE REALLOCATION IN A NETWORK

CROSS REFERENCE TO RELATED APPLICATION(S)

This application is a divisional of U.S. patent application Ser. No. 15/647,676 filed Jul. 12, 2017 and issued as U.S. Pat. No. 10,516,606 on Dec. 24, 2020. The aforementioned application, and issued patent, is incorporated herein by reference, in its entirety, for any purpose.

TECHNICAL FIELD

Embodiments described herein generally relate to optimizing routing of communication between devices and reallocation of processing resources in a network based on resource availability, and in particular based on prediction of resource availability.

BACKGROUND OF THE DISCLOSURE

The use of mobile communication devices, such as mobile phones (e.g., smart phones), tablets, and laptops while on-the-go has become a ubiquitous routine in society. As the adaptation of on-the-go communication practice becomes more widespread, limitations on the communication systems are becoming apparent. For example, during peak communication hours where there is increased communication traffic, a cellular network might experience sluggishness due to an overly leveraged communication system or communication across a WiFi hotspot zone may experience significant delays.

As such, it is desirable to have a system and method that optimizes routing of communication packets or signals between mobile devices in a manner that avoids communication sluggishness across a network.

BRIEF DESCRIPTION OF THE DRAWINGS

Reference will now be made to the attached drawings, when read in combination with the following specification, wherein like reference numerals refer to like parts throughout the several views, and in which.

DETAILED DESCRIPTION

Figure 1:
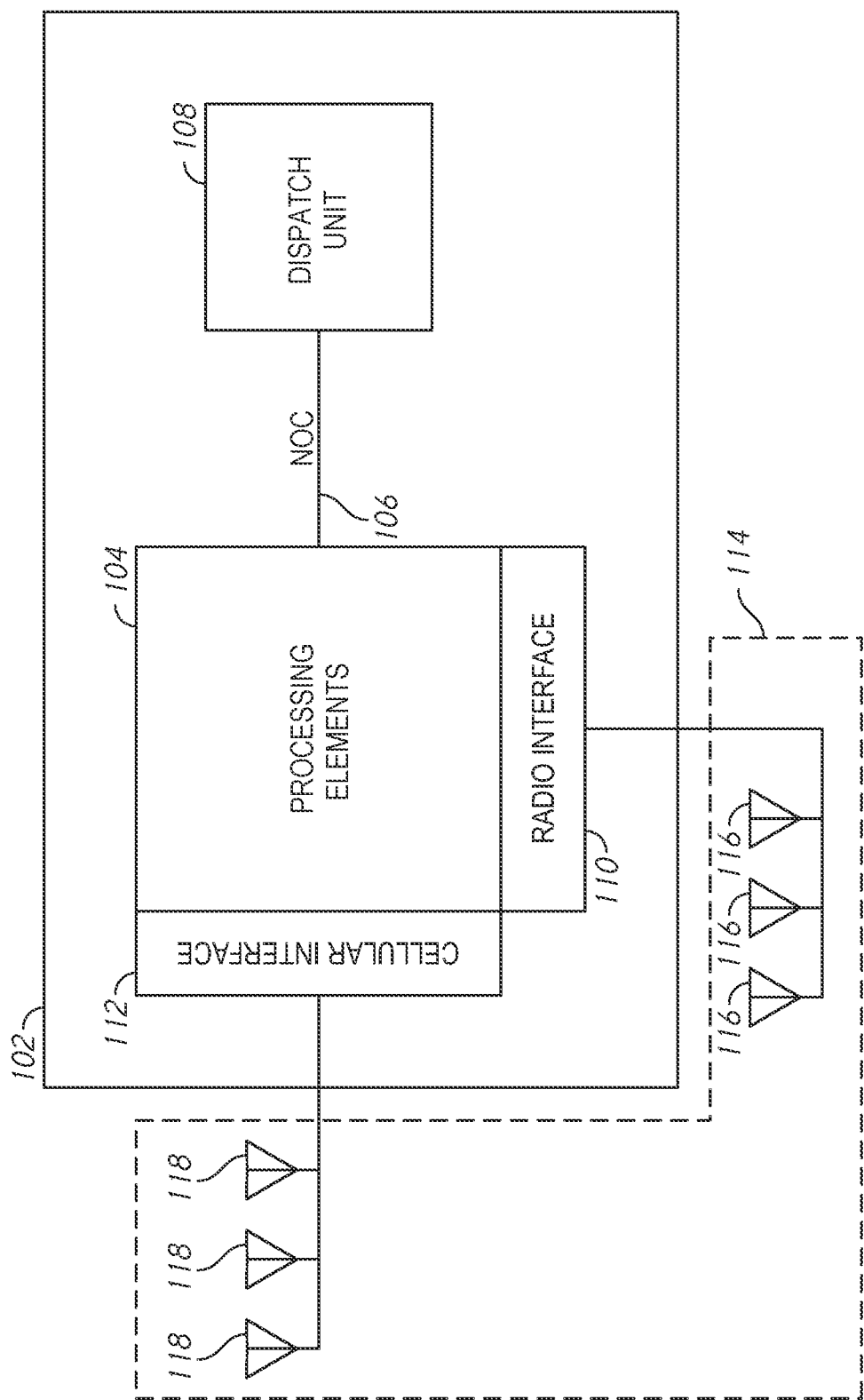
FIG. 1 is a block diagram of an integrated circuit chip, according to one illustrated embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Various examples of embodiments of the invention will now be described. The following description provides specific details for a thorough understanding and enabling description of these examples. One skilled in the relevant art will understand, however, that embodiments of the invention may be practiced without many of these details. Likewise, one skilled in the relevant art will also understand that embodiments incorporate many other obvious features not described in detail herein. Additionally, some well-known structures or functions may not be shown or described in detail below, so as to avoid unnecessarily obscuring the relevant description. For example, in some instances, well-known wireless communication components, circuits, control signals, timing protocols, computing system components, and software operations have not been shown in detail in order to avoid unnecessarily obscuring the described embodiments of the invention.

The terminology used herein is to be interpreted in its broadest reasonable manner, even though it is being used in conjunction with a detailed description of certain specific examples of the invention. Indeed, certain terms may even be emphasized below; any terminology intended to be interpreted in any restricted manner will, however, be overtly and specifically defined as such in this Detailed Description section.

The figures along with the following discussion provide a brief, general description of a suitable environment in which embodiments of the invention can be implemented. Although not required, aspects of various embodiments are described below in the general context of computer-executable instructions, such as routines executed by a general purpose data processing module, e.g., a networked server computer, cloud server, mobile device, tablet, or personal computer. Those skilled in the relevant art will appreciate that embodiments can be practiced with other communications, data processing, or computer system configurations, including: Internet appliances, hand-held devices (including smart phones, tablets, and personal digital assistants (PDAs)), wearable computers, all manner of corded, landline, fixed line, cordless, cellular or mobile phones, smart phones, multi-processor systems, microprocessor-based or programmable consumer electronics, set-top boxes, network PCs, mini-computers, mainframe computers, media players and the like. Indeed, the terms "computer," "server," and the like are generally used interchangeably herein, and refer to any of the above devices and systems, as well as any data processor.

While embodiments of the invention, such as certain functions, may be described as being performed on a single device, embodiments of the invention can also be practiced in distributed environments where functions or modules are shared among disparate processing devices, which are linked through a communications network, such as, for example, a Local Area Network (LAN), Wide Area Network (WAN), the Internet, Bluetooth, and Zigbee. In a distributed computing environment, program modules may be located in both local and remote memory storage devices.

Embodiments of the invention may be stored or distributed on tangible computer-readable media, including magnetically or optically readable computer discs, cloud servers, hard-wired or preprogrammed chips (e.g., EEPROM semiconductor chips), reconfigurable circuit chips, nanotechnology memory, biological memory, or other data storage media. Alternatively or additionally, computer implemented instructions, data structures, screen displays, and other data under aspects of embodiments of the invention may be distributed over the Internet and via cloud computing networks or on any analog or digital network (packet switched, circuit switched, or other scheme).

The computer readable medium stores computer data, which data may include computer program code that is executable by a computer, in machine readable form. By way of example, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Embodiments of the invention are described herein with reference to operational illustration of modules and flowcharts having functional blocks to illustrate methods employed by modules to re-route communication packets through an optimized communication path based on predicted and/or actual processing resource availability across a network. It will be understood that each of the modules, blocks, and combinations thereof may be implemented by analog or digital hardware and computer program instructions. The computer program instructions may be provided to a processor of a general purpose computer, special purpose computer, application-specific integrated circuit (ASIC), or other programmable data processing apparatus such that the instructions, which execute via the processor of the computer or other programmable data processing apparatus, implements the functions/acts specified in the functional blocks of the flowcharts and/or the operational modules.

In some embodiments, the methods illustrated by the functional blocks may occur out of the order noted in the operational illustration of the modules. For example, two blocks shown in succession may be executed substantially concurrently. Alternatively and/or additionally, the blocks may be executed in reverse order.

A module is a software, hardware, or firmware (or combination thereof) system, process or functionality, or component thereof, that performs or facilitates the processes, features, and/or functions described herein. A module may include sub-modules. Software components of a module may be stored on a computer readable medium. Modules may be integral to one or more servers, or be loaded and executed by one or more servers. One or more modules may be grouped into an application.

Embodiments disclosed herein may recognize that a single chip solution for processing communications signals provides reduced power consumption and a smaller physical footprint, which may make a single chip solution preferable in mobile and/or wireless systems, such as smartphones. Moreover, such single chip solutions may provide increased versatility by allowing for the dynamic allocation of processing elements to process communications signals. Such single chip solutions may also integrate traditional wireless communications bands (e.g., industrial, scientific, and medical radio band) with sub 1-GHz bands that many emerging Internet of Things (IoT) systems may utilize. Stated differently, the single chip solutions described herein are not limited to certain frequency bands like traditional systems (e.g., a smartphone being limited to 4G long-term evolution (LTE), WiFi, and/or Bluetooth®). Instead, examples of single-chip solutions described herein may integrate those communication technologies with transceivers for IoT systems, such as Z-Wave operating at 900 MHz; radio frequency identification (RFID) systems operating at any of 13.56 MHz, 433 MHz, or 902-928 MHz ranges; and/or even microwave frequencies at 3.1-10 GHz.

In various embodiments, a processing element with a reconfigurable fabric can be used to process different protocols, according to the demand of a wireless system or an IoT system. For example, hardware and power complexity may be reduced when utilizing the reconfigurable fabric space for baseband and digital front end and processing for any type of analog processing system (e.g., different antennas for corresponding frequency bands). In contrast to conventional wireless transceivers and IoT reader systems, the processing capability of each of those receiver systems may be integrated into the reconfigurable fabric space that can be dynamically shifted for processing of signals from any analog processing system. In this shared reconfigurable fabric space application, processing for each receiver system may be allocated to a respective cluster(s) of processing elements. In such an embodiment, the aggregate processing results of each receiver system can be processed in the shared, coherent memory space, before deciding whether to transmit an aggregated processing result via a specific transmitter. For example, using a shared reconfigurable fabric, a processing result derived from measurements of an IoT system and information from an LTE system can be transmitted via an RFID system, in some examples, utilizing the same processing element.

FIG. 1 is a block diagram of an integrated circuit chip 102, in accordance with an embodiment of the present invention. The integrated circuit chip 102 is a single chip capable of processing communications signals. Examples of single chip systems include those where circuitry for performing the described tasks are fabricated on and/or into a common substrate generally using semiconductor fabrication techniques. The integrated circuit chip 102 includes a plurality of processing elements 104, a network on chip (NOC) 106, a dispatch unit 108, a radio interface 110, and a cellular interface 112. The integrated circuit chip 102 may be coupled to a plurality of antennas 114. The plurality of antennas 114 may include a first set of antennas 116 and a second set of antennas 118.

The processing elements 104 may be implemented using one or more processors, for example, having any number of cores. In some examples, the processing elements 104 may include circuitry, including custom circuitry, and/or firmware for performing functions described herein. For example, circuitry can include multiplication unit/accumulation units for performing the described functions, as described herein. Processing elements 104 can be any type including but not limited to a microprocessor or a digital signal processor (DSP), or any combination thereof. For example, processing elements 104 can include levels of caching, such as a level one cache and a level two cache, a core, and registers. An example processor core can include an arithmetic logic unit (ALU), a bit manipulation unit, a multiplication unit, an accumulation unit, an adder unit, a look-up table unit, a memory look-up unit, or any combination thereof.

The NOC 106 may be implemented as an on-chip communications sub-system configured to facilitate communication between the processing elements 104 and the dispatch unit 108. The NOC 106 may include, for example, one or more links, such as copper wires, connecting the processing elements 104 and the dispatch unit 108 and configured to carry information from the processing elements 104 to the dispatch unit 108 and vice versa.

The dispatch unit 108 may include instructions sets (e.g., one or more program instructions or operations) to be performed by the processing elements 104. The dispatch unit may include, for example, computer software, hardware, firmware, or a combination thereof configured to provide instruction sets from a storage device to the processing elements 104. For example, the instruction sets may include instructions to perform certain logic or arithmetic operations on data, transmit data from one processing element 104 to another processing element 104, or perform other operations. In some embodiments, a first processing element instruction set 108 may be loaded onto a first processing element 104 and include instructions for a processing element to receive a signal of a first type (e.g., a signal associated with a received radio signal), to process the received signal of a first type to generate a set of data, and to transmit the set of data to a second processing element 104. A second processing element instruction set 108 may be loaded onto a second processing element 104 and be configured to receive the set of data, process the set of data to generate a second signal of a second type and to transmit the second signal with a plurality of antennas. The dispatch unit 108 may retrieve instructions for the processing elements 104 from one or more memories, such as a volatile (e.g., dynamic random access memory (DRAM)) or non-volatile memory (e.g., Flash memory). The processing element instruction sets may be stored in one or more data structures, such as a database.

The radio interface 110 may be coupled to the plurality of antennas 114 and to one or more of the processing elements 104. The radio interface 110 may be configured to receive radio signals detected by the plurality of antennas 114 and convert the received signals into a signal that can be manipulated by the one or more processing elements 104 and route the resulting signal to the one or more processing elements. In some embodiments, radio interface 110 may include an analog to digital converter. In other embodiments, the radio interface 110 may include additional or different components, circuits, etc. Although described as a "radio interface," in some examples, the interface may generally be adapted to convert a received signal of any type to a signal that can be manipulated by the processing elements 104. For example, the radio interface 110 may be configured to receive Wi-Fi signals, optical signals, auditory signals, or any other type of signals. In some embodiments, the radio interface 110 is configured to receive RFID signals detected by the plurality of antennas 114 and to provide the received signals to the one or more processing elements 104.

The cellular interface 112 may be coupled to the plurality of antennas 114 and to one or more of the processing elements 104. The cellular interface 112 may be configured to transmit/receive cellular signals with the plurality of antennas 114 and convert the signals between a signal that can be manipulated by the one or more processing elements 104 and a signal that can be transmitted using the plurality of antennas 114. In some embodiments, cellular interface 112 may include a digital to analog converter. In other embodiments, the cellular interface 112 may include additional or different components, circuits, etc. Although described as a "cellular interface," in some examples, the interface may generally be adapted to any type of signal. A cellular signal may generally refer to any protocol of cellular signal, such as 3G, 4G, 4G LTE, 5G, etc. The cellular interface 112 may be configured to transmit Wi-Fi signals, optical signals, auditory signals, or any other type of signals. In some embodiments, the cellular interface 112 is configured to transmit a different type of signal than the radio interface 110.

The plurality of antennas 114 is configured to receive and transmit wireless signals. The plurality of antennas 114 may generally be any type of antennas, such as a wire antenna (e.g., a dipole antenna, a loop antenna, a monopole antenna, a helix antenna, etc.), an aperture antenna (e.g., a waveguide, a horn antenna, etc.), a reflector antenna (e.g., a parabolic reflector, a corner reflector, etc.), a lens antenna (e.g., a convex-plane, a concave-plane, a convex-convex, or a concave-concave), a microstrip antenna (e.g., a circular shaped, rectangular shaped, metallic patch, etc.), an array antenna (e.g., a Yagi-Uda antenna, a micro strip patch array, an aperture array, a slotted wave guide array, etc.), or combinations thereof.

In the embodiment of FIG. 1, the plurality of antennas 114 includes a first subset of antennas 116 configured to receive radio signals and to communicate the received signals to the radio interface 110. The plurality of antennas 114 further includes a second subset of antennas 118 configured to communicate over a cellular network. The second subset of antennas 118 may receive signals from the cellular interface 112 and transmit the received signals to one or more cellular nodes (not shown), such as a cellular tower. In various embodiments, the plurality of antennas 114 may be configurable. For example, antennas in the plurality of antennas 114 may be adjustable to receive and/or transmit signals of different types. In such embodiments, the first subset of antennas 116 and the second subset of antennas 118 may be the same antennas. For example, the first subset of antennas 116 may be configured to receive radio signals, such as an RFID signal and to communicate the received radio signal to the processing elements 104 via the radio interface 110. The first subset of antennas 116 may be reconfigured to communicate using a cellular network as the second subset of antennas 118. For example, the plurality of antennas 118 may include or be coupled to an integrated inner mechanism, such as RF switches, varactors, mechanical actuators, or tunable materials, that enable the intentional redistribution of currents over the surface of the antenna to produce modifications of its properties. The processing elements 104 may process the received radio signals according to the instruction sets fetched by the dispatch unit 108 and communicate a resulting cellular signal to the second subset of antennas 118 via the cellular interface 112. The second subset of antennas 118 may then communicate the received signals via a cellular network.

Figure 2:
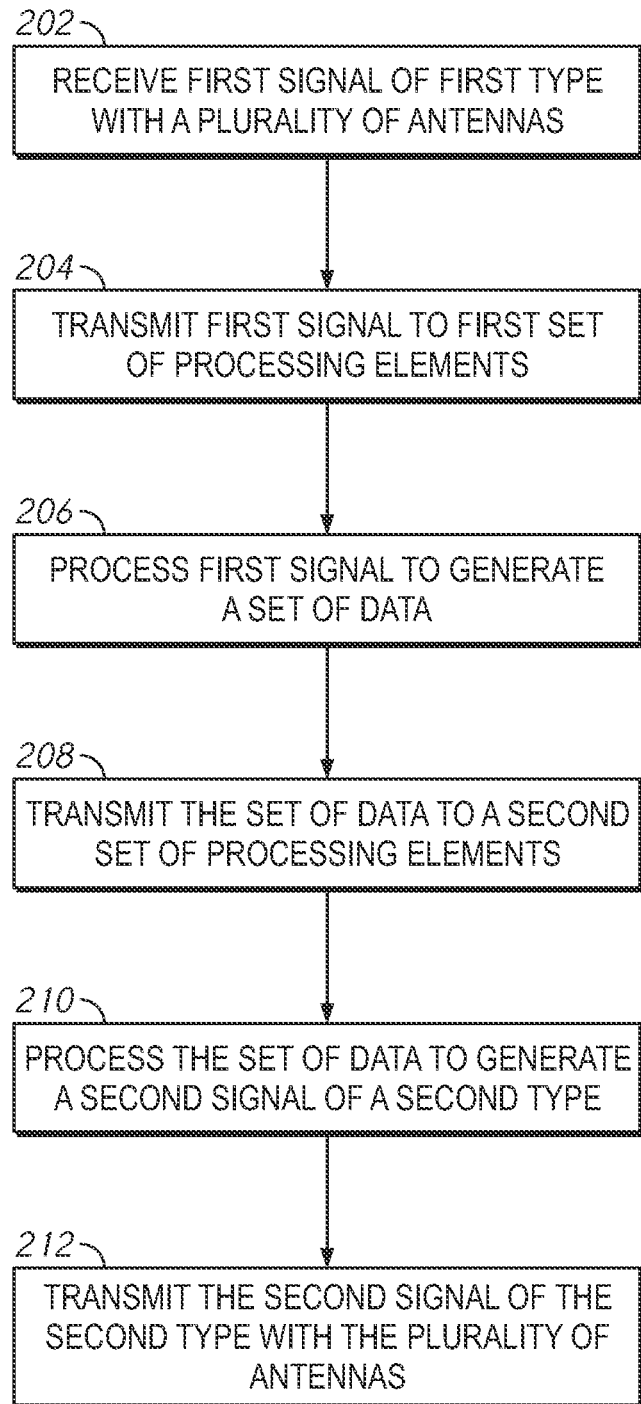
FIG. 2 is a flowchart illustrating a method for processing signals with a single integrated circuit chip, according to one illustrated embodiment.

FIG. 2 is a flowchart illustrating a method of processing signals with a single integrated circuit chip, in accordance with an embodiment of the present invention.

In operation 202, a first signal of a first type is received with a plurality of antennas. The signal may be received, for example, with the plurality of antennas 114, and specifically with the first subset of antennas 116. In various embodiments, the first signal of the first type may be a radio signal associated with an RFID device. The first subset of antennas 114 may employ beam forming to detect one or more first signals of the first type. Beamforming is a signal processing technique that enables directional signal transmission or reception. Beamforming typically uses a phased antenna array in such a way that signals at particular angles experience constructive interference while signals at other angles experience destructive interference.

In operation 204, the first signal of the first type is provided to a first set of processing elements. For example, the first subset of antennas 116 may provide the received first signal of the first type to one or more of the processing elements 104 via the radio interface 110. The particular processing element(s) 104 to which the first signal of the first type is provided may be determined, for example, by the instructions sets provided by the dispatch unit 108.

In operation 206, the first signal of the first type is processed to generate a set of data. For example, the one or more processing elements 104 may process the received first signal to generate a particular set of data. The set of data may generally be any type of data. For example, the set of data may include location information for one or more devices that transmitted the first signal of the first type. In one embodiment, an RFID device emits a radio signal. The radio signal is detected by the first subset of antennas 116. The one or more processing elements 104 may process the received signals based on known beamforming or interferometry properties of the first subset of antennas 116 to derive location information about the one or more RFID devices.

In operation 208, the set of data may be transmitted to a second set of processing elements. For example, the first set of processing elements 104 may transmit the set of data to a second set of processing elements 104. The particular processing elements 104 included in the second set may be identified by the processing element instruction set(s) 108 being executed by the first set of processing elements 104. For example, the processing element instruction set 108 may include address information for the second set of processing elements 104. Once the first set of processing elements 104 generates the set of data, the processing element instruction set 108 may instruct the first set of processing elements 104 to transmit the set of data to a switch. The switch may then transmit the set of data to the second set of processing elements 104.

In operation 210, the set of data may be processed to generate a second signal of a second type. For example, the set of data may be formatted for transmission according to a communications protocol P corresponding to the second type of signal. The communications protocol P may, for example, be a cellular communications protocol $P_{cell}$, such as 3G, 4G, or 5G. In other embodiments, the communications protocol P may be Wi-Fi protocol $P_{WiFi}$, Bluetooth® protocol $P_{IoT}$, or any other type of communication protocol P.

In operation 212, the second signal of the second type is transmitted with the plurality of antennas. For example, the second set of processing elements 104 may transmit the second signal of the second type to the plurality of antennas 114 and specifically to the second subset of antennas 114 via the cellular interface 112. The second subset of antennas 118 may transmit the second signal of the second type to a cellular tower for example, or in the case of Wi-Fi, to a Wi-Fi node, such as a router.

Figure 3:
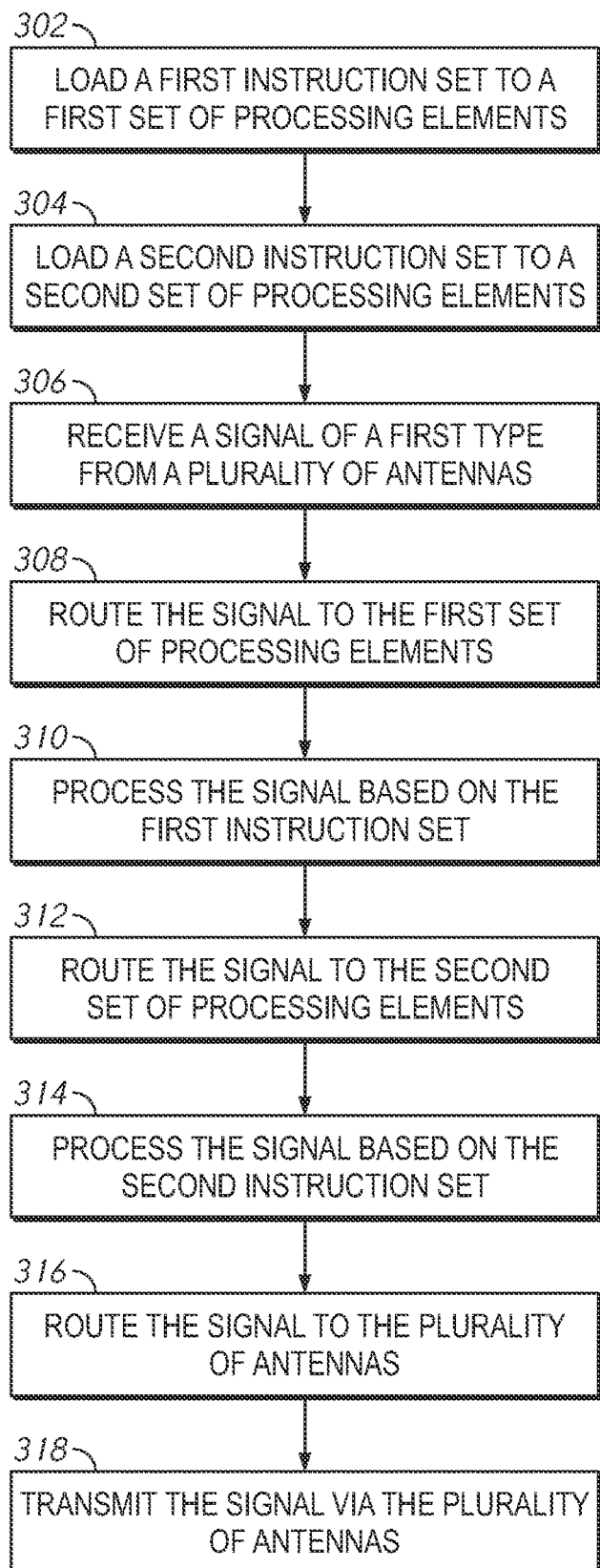
FIG. 3 is a flowchart illustrating a method for processing signals with a single integrated circuit chip, according to one illustrated embodiment.

FIG. 3 is a flow chart illustrating a method of processing signals with a single integrated circuit chip, in accordance with an embodiment of the present invention.

In operation 302, a first instruction set is loaded to a first set of processing elements. For example, an instruction set of the processing elements loaded by the dispatch unit 108 may be transferred to a first set of processing elements 104 via the NOC 106. The first set of processing elements 104 may process data according to the received first instruction set.

In operation 304, a second instruction set is loaded to a second set of processing elements. For example, an instruction set of the processing elements 104 loaded by the dispatch unit 108 may be transferred to a second set of the processing elements 104, different from the first set of processing elements 104 in operation 302, via the NOC 106. The second set of processing elements 104 may process data according to the received second instruction set. The second instruction set may generally include any types of instructions. In one embodiment, the second instruction set includes instructions to convert received signals from a first format (e.g., signal type or communications protocol) to a second format. For example, the second instruction set may include instructions to convert a signal from an RFID format to a format that can be communicated via cellular or WiFi network.

In operation 306, a signal of a first type is received from a plurality of antennas. For example, the plurality of antennas 114 may detect one or more signals of a first type, such as a radio frequency signal (e.g., and RFID signal). In one embodiment, the signal of the first type may be received by the first set of antennas 116.

In operation 308, the signal of the first type is routed to the first set of processing elements. For example, the plurality of antennas 114 may transfer the received signal of the first type to the radio interface 110. The radio interface 110 may transfer the signal of the first type to the first set of processing elements. As discussed above, the radio interface 110 may include various circuits, such as analog to digital converters, etc.

In operation 310, the signal of the first type is processed based on the first instruction set. For example, the first set of processing elements 104, into which the first instruction sets were loaded in operation 302, may process the received signal of the first type in accordance with the first instruction set. For example, the first instruction set may include processing instructions to determine a location of one or more sources of the signals of the first type. However, those skilled in the art will appreciate that any series of instructions may be executed by the first set of processing elements 104.

In operation 312, the processed signal is routed to a second set of processing elements. For example, the first instruction set loaded into the first set of processing elements 104 may include instructions to transfer the processed signal of the first type to the second set of processing elements 104 into which the second instruction set was loaded in operation 304. Specifically, the first set of processing elements 104 may transfer the processed signal to one or more switches along with an instruction to transmit the signal to the particular processing elements 104 executing the second instruction set. The one or more switches may then transfer the processed signal to the second set of processing elements 104.

In operation 314, the signal is processed based on the second instruction set. For example, the second set of processing elements 104, into which the second instruction set was loaded in operation 304, may process signals received in operation 312 to generate signals of a second type. As a specific example, the second set of processing elements may convert received signals into a format that can be transmitted via a cellular network or a WiFi network. Such processing may include, for example, converting the received signals into data packets of information for transmission.

In operation 316, the signal is routed to the plurality of antennas. For example, the second set of processing elements 104 may transmit the processed signal to the cellular interface 112. As discussed above, the cellular interface 112 may include various circuits, such as an analog to digital converter. The cellular interface 112 may provide the signal of the second type to the plurality of antennas 114. In a specific example, the cellular interface 112 may provide the signal of the second type to the second set of antennas 118. In various embodiments, the second set of antennas 118 may be the same antennas as the first set of antennas 116 on which the signal of the first type was received in operation 306.

In operation 318, the signal of the second type is transmitted via the plurality of antennas.

Figure 4:
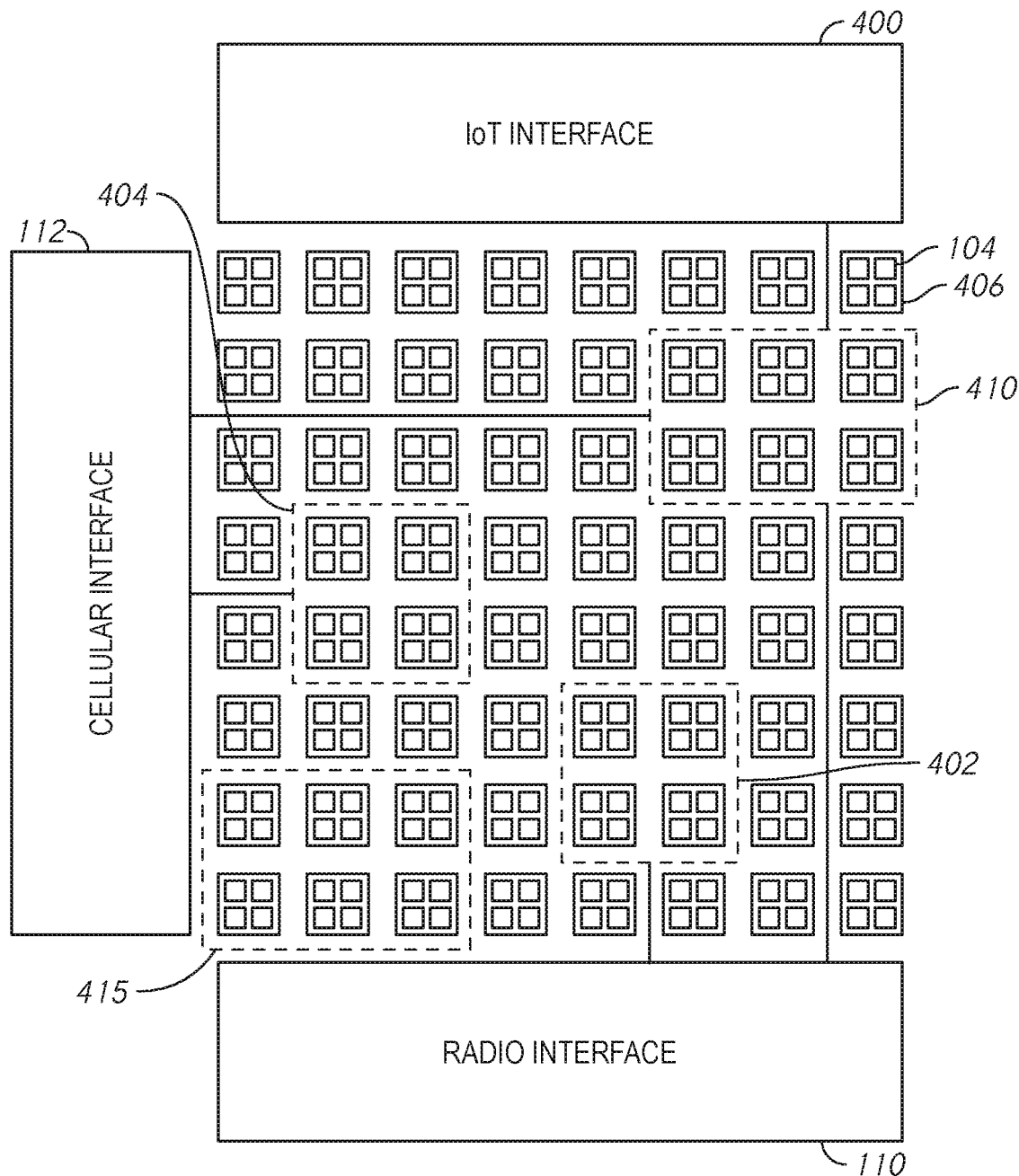
FIG. 4 is block diagram of plurality of processing elements and communication interfaces, according to one illustrated embodiment.

FIG. 4 is a block diagram of plurality of clusters 406 of processing elements 104, a radio interface 110, a cellular interface 112, and an IoT interface 400, in accordance with an embodiment of the present invention. The clusters 406 of processing elements 104, the radio interface 110, and the cellular interface 112 may be implemented as described above with respect to FIG. 1. Similarly to the radio and cellular interfaces 110, 112 described above, the IoT interface 400 may be coupled to the plurality of antennas 114 and to the one or more of the processing elements 104. The IoT interface 400 may be configured to transmit and/or receive communication packets or signals at a sub 1-GHz band (i.e., IoT band) via the plurality of antennas 114. The received communication packets at the IoT frequency band may be converted by the IoT interface into a signal or communication packets that may be manipulated by the one or more processing elements 104 and route the resulting signal to the one or more processing elements 104.

As shown in FIG. 4, some of the clusters 406 may be grouped into one or more sets. For example, a first number of clusters 406 may be grouped into a first set 402 and a second number of clusters 406 may be grouped into a second set 404. Each of the clusters 406 in the first set 402 may be coupled to the radio interface 110, and the radio interface may route received signals to the clusters 406 in the first set 402. Each of the processing elements 104 in the clusters 406 may have a first instruction set loaded thereon and may process signals received from the radio interface 110 according to the first instruction set. The clusters 406 of the first set 402 may transmit processed signals to the clusters 406 of the second set 404 via one or more switches. Each of the processing elements 104 of the clusters 406 of the second set 404 may have a second instruction set loaded thereon and process the received signals according to the second instruction set to generate signals of a second type. The clusters 406 of the second set 404 may be coupled to the cellular interface 112 and may transfer the signals of the second type to the cellular interface 112 to be transmitted via a plurality of antennas (not shown).

Although each of the first set 402 and the second set 404 are shown as including nine clusters 406, greater or fewer clusters 406 may be dynamically added or subtracted from the first set 402 and/or the second set 404 based on system demands or signaling volumes. For example, if the number of radio signals received by the antennas and transmitted to the radio interface 110 increases, additional clusters 406 may be added to the first set 402 to handle the increased processing load.

Furthermore, additional sets of clusters 406 may be included within the reconfigurable fabric. For example, a third and fourth number of clusters 406 may be grouped into a third set of clusters 410 and fourth set of clusters 415. The third set of clusters 410 may correspond with a packet module 710, while the fourth set of clusters 415 may correspond with a routing module 715. Both the packet module 710 and the routing module 715 will be described in detail herein.

Figure 5:
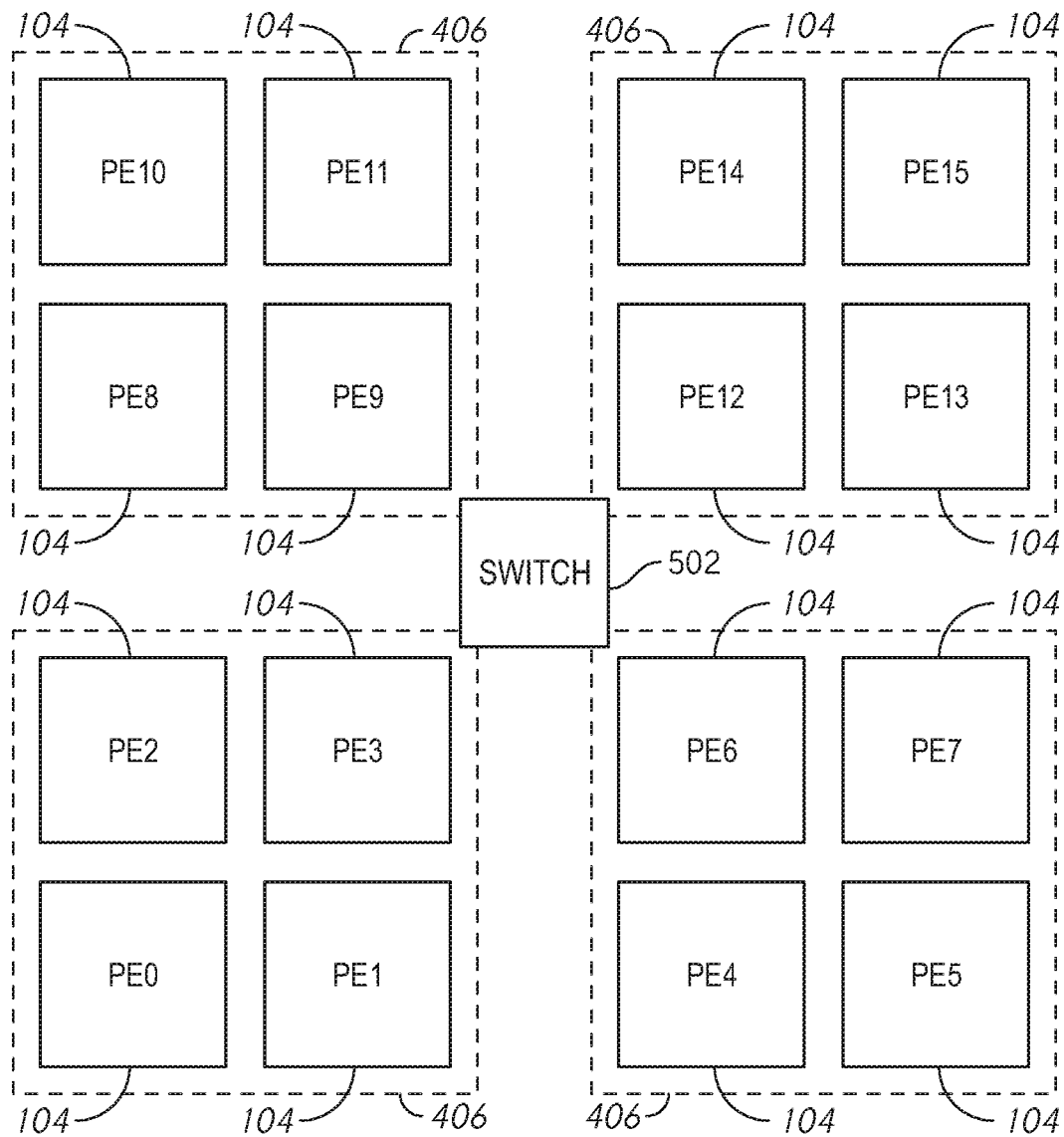
FIG. 5 is a block diagram of a plurality of processing elements, according to one illustrated embodiment.

FIG. 5 is a block diagram of a plurality of clusters 406 coupled through a switch 502, in accordance with an embodiment of the present invention. In the embodiment of FIG. 5, each cluster 406 includes four processing elements 104. Each processing element 104 of a given cluster 406 may communicate directly with another processing element 104 within that same cluster 406. For example, each of the processing elements PE0-3 can directly communicate with one another. Similarly, processing elements PE4-7 can communicate directly, as can processing elements PE8-11 and PE12-15. Processing elements 104 of different clusters 406 may communicate with one another via a switch 502 based on instructions in whatever instruction set is loaded for a given processing element 104. For example, the processing element PE14 may transmit a signal to the switch 502 with an instruction that the signal should be routed to the processing element PE1. The switch may route the signal directly to the processing element PE1 or the switch may route the signal to another processing element in the same cluster as PE1 (i.e., processing elements PE0, PE2, or PE3), which then route the received signal to processing element PE1. By linking clusters of processing elements together in this manner, greater or fewer clusters 406 may be added simply by changing the instruction sets that are loaded for a set of processing elements.

Figure 6:
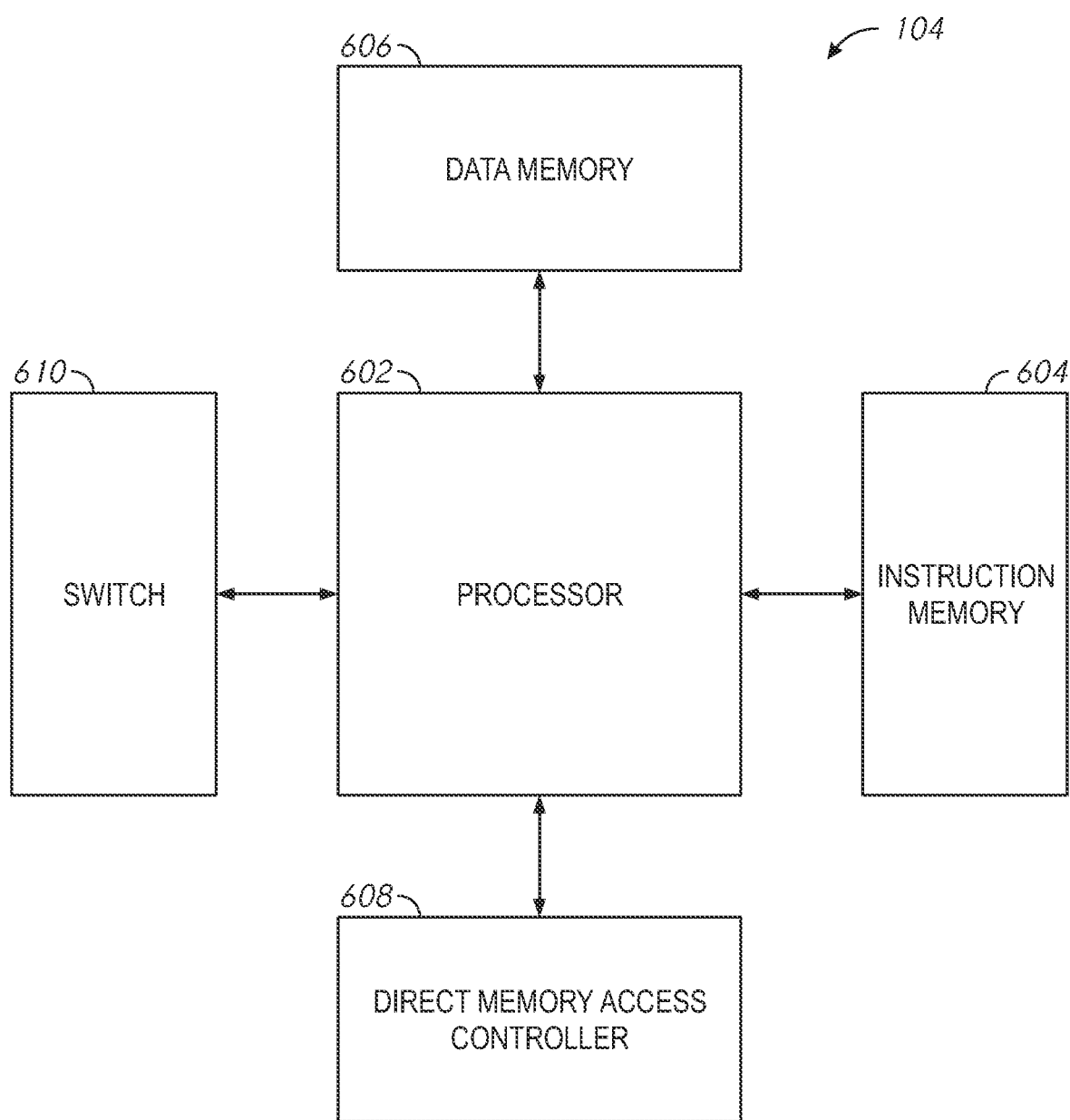
FIG. 6 is a block diagram of a processing element, according to one illustrated embodiment.

FIG. 6 is a block diagram of a processing element 104, in accordance with an embodiment of the present invention. The processing element 104 generally includes a processor 602 coupled to an instruction memory 604, a data memory 606, a direct memory access controller 608, and a switch 610.

The processor 602 may include, for example, a number of processing cores. In some examples, the processor 602 may include circuitry, including custom circuitry, and/or firmware for performing functions described herein. For example, circuitry can include multiplication units/accumulation units for performing operations described herein. The processor 602 may be, for example, a microprocessor or a digital signal processor (DSP), or any combination thereof. An example processor core can include an arithmetic logic unit (ALU), a bit manipulation unit, a multiplication unit, an accumulation unit, an adder unit, a look-up table unit, a memory look-up unit, or any combination thereof. The instruction memory 604 is a memory device configured to store a processing element instruction set. The instruction memory 604 may generally be any type of memory. For example, the instruction memory 604 may be a volatile memory, such as dynamic random access memory, or non-volatile memory, such as flash memory. The data memory 606 is a memory device configured to store received data, such as the data included in the signals received and/or transmitted from the plurality of antennas 114. The data memory 606 may generally be any type of memory. For example, the data memory 606 may be a volatile memory, such as dynamic random access memory, or non-volatile memory, such as flash memory. The direct memory access controller 608 includes control circuitry for the processor 602 to access the instruction memory 604 and the data memory 606. The switch 610 routes data from one processing element 104 to another processing element 104. For example, the switch 610 may route data from one processing element 104 to another processing element 104 within a single cluster 406. The switch may generally be any type of switching fabric.

In operation, a processing element instruction set 108 may be loaded into and stored in the instruction memory 604. Data in the form of the received signals are stored in the data memory 606. The processor 602 processes the data in the data memory 606 in accordance with the processing element instruction set stored in the instruction memory 604. For example, the processor 602 may perform arithmetic operations, convert the data from one format to another, or perform any other type of operations. The direct memory access controller 608 may control access of the processor 602 to the instruction memory 604 and/or the data memory 606. The processor 602 may transfer processed data to one or more other processing elements 104 via the switch 610.

Figure 7:
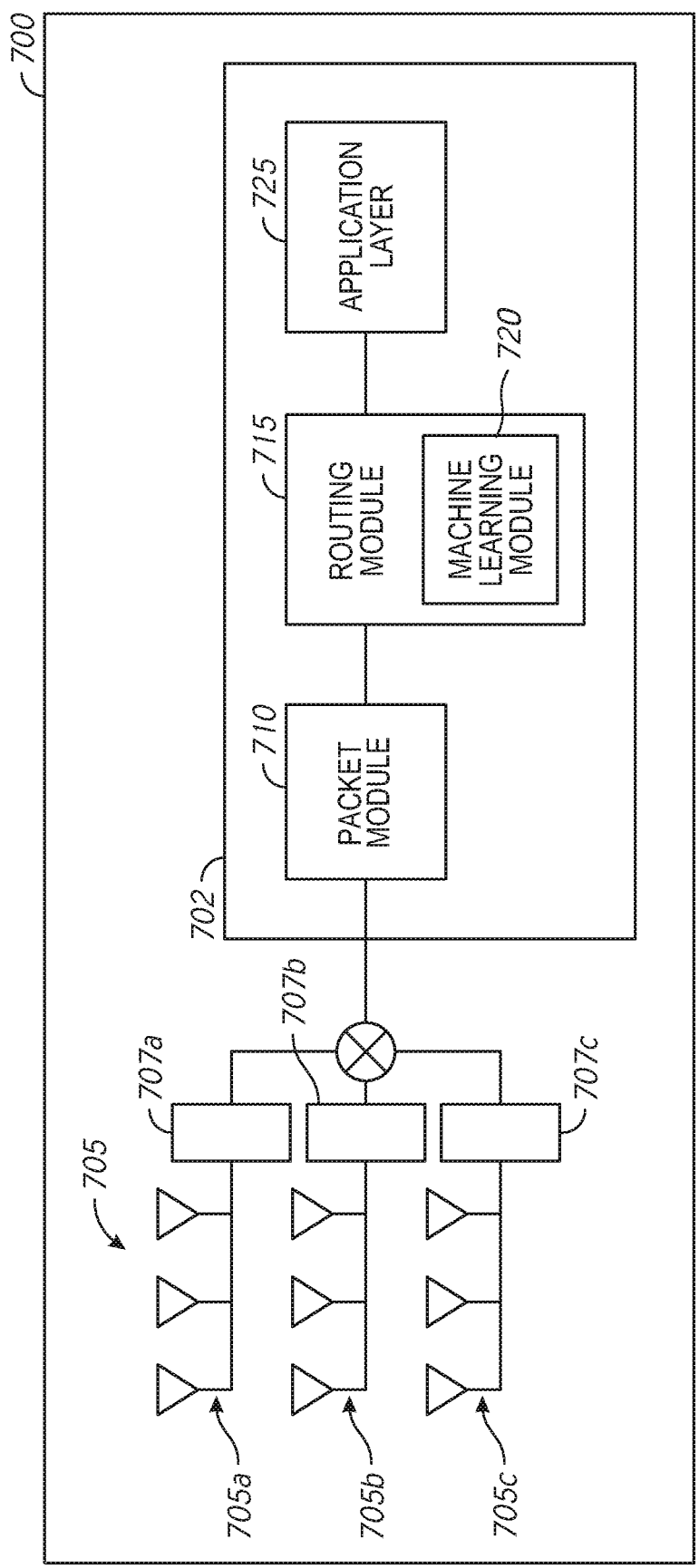
FIG. 7 is a block diagram of an integrated circuit chip configured to optimize routing of communication packets, according to one illustrated embodiment.
Figure 8:
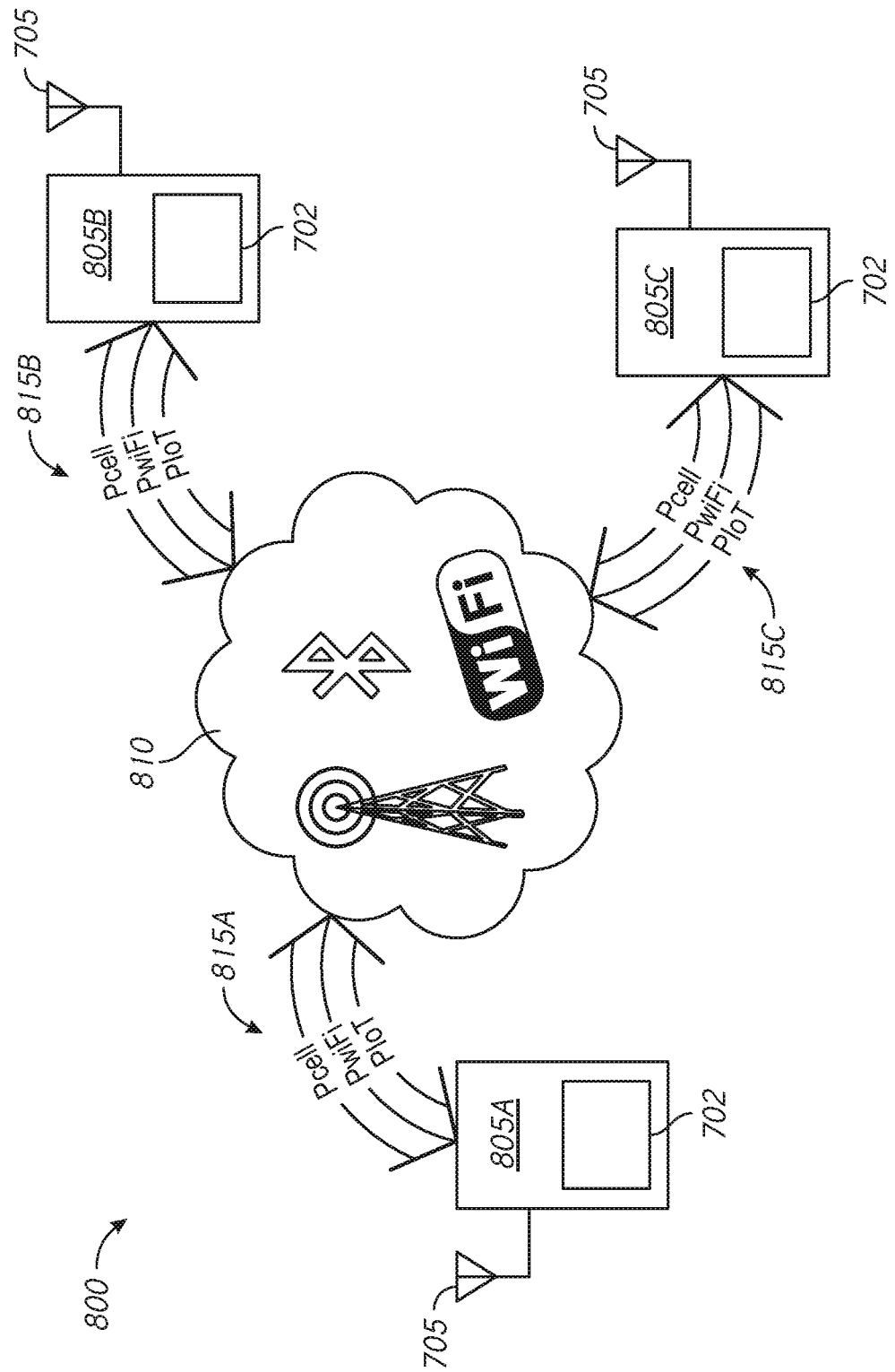
FIG. 8 is a graphical representation of a communication system having a plurality of devices communicatively coupled via a network, according to one illustrated embodiment.

FIG. 7 shows a block diagram of the communication device 700 having an integrated circuit chip 702 and a plurality of antennas 705 embedded therein, while FIG. 8 shows a graphical representation of a communication system 800 having a plurality of communication devices 805 communicatively coupled via a network 810, according to one illustrated embodiment. Reference will now be made to both FIGS. 7 and 8.

The integrated circuit chip 702 is configured to optimize routing of communication packets or signals from a source device 805A to a destination device 805B via one or more of the plurality of communication devices 805 through the network 810, as illustrated in FIG. 8. The network 810 may be configured to provide a plurality of communication paths 815A, 815B, 815C (collectively referenced 815) to route the communication packets or signals via a plurality of communication protocols $P_{cell}$, $P_{WiFi}$, $P_{IoT}$ (collectively referenced P). The plurality of communication paths 815 include data transmission paths between one or more of the plurality of devices 805 via one or more of the plurality of communication protocols P. The network 810 may, for example, take the form of one or more cellular, WiFi, and IoT (e.g., Bluetooth, ZIGBEE) networks operable to transmit signals or communication packets via one or more of the plurality of communication protocols. The network 810 may be a Local Area Network (LAN) or Wide Area Network (WAN).

The plurality of communication devices 805 may, for example, include mobile phones, tablets, smart phones, personal computers, and laptops, to name a few. The plurality of antennas 705 are operable to transmit and receive the communication signals via a plurality of communication protocols, such as cellular, 4G LTE, 5G, WiFi, BLUETOOTH, and ZIGBEE to name a few. The plurality of antennas 705 may be communicatively coupled to a plurality of interfaces 707. The plurality of interfaces 707 may include an analog to digital converter to convert the received communication signal via the plurality of antennas 705 into the communication packets that can be processed within the integrated circuit chip 702. Furthermore, the plurality of interfaces 707 may also include a digital to analog converter to convert the processed plurality of communication packets into an analog signal for transmission via the plurality of antennas 705.

In one embodiment, the plurality of antennas 705 comprise various sets of antennas 705a, 705b, 705c where each of the sets receive communication signals via different ones of the plurality of communication protocols P. The plurality of antennas 705 are operable to transmit and receive the communication packets or signals via the plurality of communication protocols P.

In one embodiment, first, second and third sets of antennas 705a, 705b, 705c, are respectively coupled to first, second, and third interfaces 707a, 707b, 707c. Each of the first, second, and third interfaces may convert the signals received via defined ones of the plurality of protocols. For example the first interface may be a cellular interface, the second interface may be a radio interface, and a third interface may be an IoT interface. In other words, the first interface 707a may be configured to convert signals received via a cellular protocol, the second interface 707b may convert signals received via the radio protocol, and the third interface 707c may convert signals received via one of the IoT protocols. It will be appreciated by those of ordinary skill in the art that the communication device 700 may employ a single set of antennas 705 coupled to a single interface 707, where signals received via any one of the plurality of protocols may be converted by the interface 707 for processing by the integrated circuit chip 702.

Similarly to the FIG. 1 description, the integrated circuit chip 702 may be a single chip capable of processing the plurality of communication packets or signals. Examples of single chip systems include those where circuitry for performing the described tasks are fabricated on and/or into a common substrate generally using semiconductor fabrication techniques. The integrated circuit chip 702 comprises a packet module 710, a routing module 715 communicatively coupled to a machine learning module 720, and an application layer 725.

The packet module 710 comprises a first plurality of processing elements 104 (or a third set of clusters 410) operable to receive the communication packets via a first one of the plurality of communication protocols P and process an optimal route to transmit the communication packets from the source device 805A to the destination device 805B via the network 810. As will be described in more detail herein, the optimal route may be one or more of the communication paths 815 through the one or more devices 805 that results in an optimized transmission of the communication packets or signals. The packet module 710 may detect transmission of the communication packets from the source device 805A intended for the destination device 805B, and process a re-route of the transmitted communication packets or signal to the destination device 805 via the optimal route of the plurality of communication paths 815. In particular, the optimal route includes the one or more of the communication paths 815 via one or more of the plurality of communication protocols P. For example, the optimal route between the source device 805A and the destination device 805B may be through the communication paths 815A and 815C via a cellular protocol $P_{cell}$ and then through communication paths 815C and 815B via a WiFi protocol $P_{WiFi}$.

The routing module 715 comprises a second plurality of processing elements 104 (or a fourth set of clusters 415) communicatively coupled to the first plurality of processing elements 104 of the packet module 710. The routing module 715 is operable to determine the optimal route to re-route the transmitted communication packets or signal from the source device 805A to the destination device 805B based on transmission characteristics associated with the plurality of devices 805. The transmission characteristics include at least one of availability of processing resources and telemetry information associated with respective ones of the plurality of devices 805.

The availability of processing resources associated with respective ones of the plurality of devices 805 may refer to a percentage of processing elements 104 available for respective ones of the plurality of communication protocols P. The processing resources include respective ones of the plurality of processing elements 104 associated with respective ones of the plurality of communication protocols P. As discussed above, the integrated circuit chip 702 includes the sets of clusters 406 having processing elements 104 therein. Each of the processing elements 104 in the clusters 406 may have instructions loaded thereon and process received signals or communication packets according to those instructions. For example, in each of the plurality of devices 805, a portion of the plurality of processing elements 104 may be instructed to process signals via a first one of the plurality of communication protocols $P_{cell}$, while another portion of the plurality of processing elements 104 may be instructed to process signals via a second one of the plurality of communication protocols $P_{WiFi}$. In other words, a defined percentage of the plurality of processing elements 104 on respective ones of the plurality of devices 805 may be allocated for a particular communication protocol P. As such, as devices communicate in real-time via various ones of the communication protocols P, availability of the processing resources may decrease. The availability of processing resources is an indication of whether transmission of signals or communication packets via particular communication protocols P and communication devices 805 may be delayed or interrupted.

The telemetry information may include at least one of velocity, direction of movement, or geographic location of respective ones of the plurality of devices 805. For example, as will be described in more detail herein, the destination device 805B may be moving outside a WiFi zone while the source device 805A attempts to transmit the signal or communication packets. The routing module 715 of at least one of the plurality of devices 805 may re-route the transmitted signal via the cellular protocols $P_{cell}$ and across the communication paths 815A and 815B to prevent disconnect while leveraging communication via the WiFi protocol. It will be appreciated by those of ordinary skill in the art that this is merely one example, and any other combination of communication paths 815, devices 805, and communication protocols P are within the scope of embodiments of the disclosure. The routing module 715 may receive telemetry information and resource availability information from each of the plurality of devices 805. The receipt of such information at the routing module 715 may occur in real-time or close to real-time. This information may be shared with the machine learning module 720 to allow of communication trends to more accurately predict a likelihood of resource availability for each of the plurality of devices 805, as well as determine efficient re-allocation of processing resources to better handle future communication requests.

The routing module 715 is communicatively coupled to a machine learning module 720. The machine learning module 720 may be located within the routing module 715, embedded within the integrated circuit chip 702, or located remote from the integrated circuit chip 702. For example, the machine learning module 720 may be located in the cloud to offload processing power from the integrated circuit chip 702. It will be appreciated by those of ordinary skill in the art, the machine learning module 720 may be located anywhere. Additionally, the machine learning module may be communicatively coupled to the routing module 715 embedded within each one of the plurality of communication devices 805. Alternatively, the machine learning module 720 may be communicatively coupled with only one of the plurality of devices 805 that is in hierarchical control of remaining ones of the plurality of devices 805 in the system 800.

The machine learning module 720 is operable to calculate the optimal route to re-route the transmitted communication packets or signal based on historic transmission characteristics associated with the plurality of communication devices 805. The historic transmission characteristics of the plurality of communication devices 805 allows the machine learning module 720 to extrapolate a likelihood that one or more of the plurality of communication devices 805 will have particular transmission characteristic in a future time. Based on the likelihood determination, the routing module 715 calculates the optimal route and instructs the packet module 710 accordingly. The optimal route may be based on at least one of the anticipated amount of available processing resources and telemetry information for respective devices 805 in the near future. The optimal route to re-route the transmitted communication packets or signal includes one or more of the communication paths 815 between one or more of the plurality of devices 805 via one or more of the plurality of communication protocols P.

Consequently, the routing module 715 leverages both the real-time (or near real-time) and anticipated resource determination when instructing the packet module 710 to route the communication packets or signal.

The following are a few example embodiments implementing the route optimization and resource allocation as described above. These are not meant to be an exhaustive listing of embodiments but a mere sampling to highlight the above-described optimization scheme.

In one embodiment, the system 800 is configured to determine a single one of the plurality of devices 805 that will have hierarchical control over remaining ones of the devices 805. For example, the device 805C may be in hierarchical control ("control device") over the source device 805A and the destination device 805B. The control device 805C may obtain hierarchical control in an ad hoc manner or as part of a hierarchical network. The ad hoc determination of the control device 805C may be in response to a contention algorithm where the control device 805C establishes control over the devices 805A and 805B. Alternatively, the system 800 may employ the hierarchical network configuration where the control device 805C is dedicated as the hierarchical control over the other devices 805A, 805B in the system 800.

In a first example, the source device 805A transmits communication packets or signals to the destination device 805B via a first communication protocol $P_{cell}$ (e.g., cellular) at a same time each day. The destination device 805B may consistently travels through a same WiFi zone at that time. Additionally, a user of the destination device 805B may typically be downloading data on the device 805B via the first communication protocol $P_{cell}$ at the same time each day while traversing between WiFi and non-WiFi zones. The machine learning module 720 may learn the transmission characteristics associated with the devices 805A and 805B, namely that the source device 805A transmits the signal via the first communication protocol $P_{cell}$ and that the destination device 805B travels through a WiFi zone at the same time each day while the destination device 805B downloads data via the first communication protocol (e.g., 4G LTE). Consequently, the routing module 715 may instruct the packet module 710 to specifically re-route the communication packets from the source device 805A to the destination device 805B to create efficient or optimized communications. In particular, the source device 805A may transmit the communication packets via the first communication protocol $P_{cell}$ to the control device 805C, and then the control device 805C may transmit the communication packets to the destination device 805B via a second communication protocol $P_{WiFi}$ (e.g., WiFi communication). As such, the optimal route processed by the routing module and implemented by the packet module allows for leveraging one or more of the devices 805 to efficiently use available processing resources.

In a second example, the control device 805C may be leveraged to reallocate processing resources for each of the plurality of devices 805 based on the transmission characteristics as determined in real-time (or close to real-time) and as predicted in the future. For example, through the machine learning module 720, the control device 805C may learn that a majority of the plurality of devices 805 leverage the processing resources for downloading streaming media content at a particular time of a day. Consequently, those ones of the plurality of devices 805 may have a majority of the plurality of processing elements 104 re-allocated to WiFi or IoT protocols during the particular time of the day. This would allow for an efficient use of the existing amount of processing resources on the integrated circuit chip 702.

Alternatively and/or additionally, rather than relying on a single one of the plurality of devices 805 to serve as the control device 805C, each one of the plurality of devices 805 may be configured to leverage its own reallocation of processing resources based on monitoring its own usage.

As a third example, the source device 805A may have its processing resources allocated to the first communication protocol $P_{cell}$ (e.g., cellular) and the second communication protocol $P_{WiFi}$ (e.g., WiFi). On the other hand, the destination device 805B may have processing resources allocated to the second communication protocol $P_{WiFi}$ and the third communication protocol $P_{IoT}$ (e.g., Zigbee, RFID, Bluetooth). The routing module 715 of the control device 805C or of any other of the plurality of devices 805 may determine the distance between the source and destination devices 805A, 805B is great and/or the WiFi network connection therebetween is clogged. In response to such determination, the routing module 715 may instruct the packet module 710 to re-route the communication packets through the communication paths 815A and 815C via the first communication protocol $P_{cell}$ to the control device 805C. Then the control device 805C may transmit the received communication packets along the communication paths 815C and 815B via the third communication protocol $P_{IoT}$ to the destination device 805B. In other words, the routing module 715 may determine a common communication protocol P between respective ones of the plurality of devices 805 to transmit the communication packets or signals. The common communication protocol P selected may be one that has sufficient processing resources available therewith.

In another embodiment, the machine learning module 720 may be operable to prioritize routing the signals or communication packets between the plurality of devices 805. In particular, the machine learning module 720 may determine priority based on historical bandwidth consumption associated with a specific type of data transmission. For example, streaming media transmission may have a higher priority than a cellular transmission, while the cellular transmission may have a higher priority than asynchronous text-messaging communication. It will be appreciated by those of ordinary skill in the art that priority ranking of various types of communication may be set according to any desired ranking. Additionally, the particular ranking of communication types may, for example, vary based on various factors such as, for example, time, day, location, weather patterns, etc.

Alternatively and/or additionally, the routing module 715 may determine prioritization of routes based, at least in part, on a defined user hierarchy associated with each of the plurality of devices 805. For example, if the source device 805A or the destination device 805B is owned by a President of a company, the President's device 805A, 805B may have a higher priority over devices 805 used by employees of the company. In other words, the communication packets or signals routed to or from the President's device 805 may be allocated a faster route (or priority route) than the route allocated to communication packets or signals transmitted to/from the employees' devices 805.

Furthermore, the routing module 715 may single out a specific communication as highest priority level for routing, regardless of the defined user hierarchy associated with respective ones of the plurality of devices 805 or bandwidth considerations. For example, the routing module 715 may allocate emergency communications (e.g., 9-1-1 calls or 9-1-1 text messaging) as highest priority communication. It will be appreciated by those of ordinary skill in the art, the routing module 715 may single out and allocate any other communication as highest priority such as, for example, calls originating from a child's school or a child's caretaker.

Prioritizing routes refers to allocating transmission of the signals or communication packets through various communication paths 815 and protocols to achieve a speedy communication between the source and destination devices 805A, 805B via the network 810. The prioritized routes may entail real-time communication without substantial communication delay. A high priority communication may be allocated a fast communication route between the source and destination devices 805A, 805B, while a low priority communication may be allocated a slower communication route between the source and destination devices 805A, 805B. As mentioned above, the control device 805C may receive the communication packets transmitted from the source device 805A intended for the destination device 805B. For example, if the plurality of devices 805 comprise more than one pair of source-destination devices 805A, 805B, the control device 805C may prioritize which ones of the source-destination device 805A, 805B pairs will have priority over the other. In other words, the control device 805C may allocate a faster communication path for a first one of the source-destination device 805A, 805B pairs and a slower communication path for a second one of the source-destination device 805A, 805B pairs. In particular, this allocation of priority may be determined in response to the control device 805C detecting at least one of the type of communication packets received at the packet module 710, the bandwidth consumption associated with the communication packets or signal as determined by the machine learning module 720, the origin of transmitted communication packets or signal, or the defined user hierarchy associated with the destination and/or source devices 805B, 805A.

Based on the control device's 805C detection, the routing module 715 will determine the one or more communication paths 815 through the one or more devices 805 that results in a transmission speed in-line with the determined priority level of the communication.

Having described some embodiments of the invention, additional embodiments will become apparent to those skilled in the art to which it pertains. Specifically, although reference was made throughout the specification and drawings to three communication devices (i.e., source, destination, and control devices), it will be appreciated that the system and methods described herein are applicable to embodiments having any number of communication devices. The embodiment of three communication devices was described merely to readily convey and describe various aspects of re-routing communication packets to optimize the communication between devices, and was not intended to limit the system in any way. For example, the routing module may instruct re-routing of the communication packets or signals from the source device to the destination devices through the control device and any other communication device within the network. Alternatively, the re-routed communication packets may be routed through any of the plurality of devices and not through the control device.

The control device may be any one of the plurality of devices 805, or embedded within a base station. Additionally, each of the plurality of communication devices 805 may have a routing module coupled to a machine learning module where the routing module communicates with other routing modules of the plurality of devices. As such, each of the plurality of devices 805 may serve as its own control device to coordinate and process optimized routing of communication packets or signals therebetween without requiring a central control device.

The term "communication packets" and "signal" have been used interchangeably herein and both refer to data that is communicated between communication devices. The "communication packets" may refer to a digitized format of data while "signals" may refer to an analog form of data. Embodiments described herein are applicable to all forms of data.

The terms "communication devices" and "devices" have been used interchangeably herein. The plurality of devices 805 may, for example, be mobile communication devices.

While the particular modules, devices, systems, and methods described herein and described in detail are fully capable of attaining the above-described objects and advantages of the invention, it is to be understood that these are example embodiments of the invention and are thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "one or more" and not "one and only one", unless otherwise so recited in the claim.

It will be appreciated that modifications and variations of the invention are covered by the above teachings and within the purview of the appended claims without departing from the spirit and intended scope of the invention.

What is claimed is:

1. A system comprising:
   a network configured to provide a plurality of communication paths to route a plurality of communication packets; and
   a plurality of devices communicatively coupled via the network, the plurality of devices comprising a source device, a destination device, and a control device, the control device in hierarchical control over at least the source and destination devices, the control device includes an integrated circuit chip comprising:
   a packet module comprising a first plurality of processing elements and configured to detect transmission of the communication packets from the source device intended for the destination device, and re-route the transmitted communication packets to the destination device via a route of the plurality of communication paths, and
   a routing module comprising a second plurality of processing elements and configured to identify the route to re-route the transmitted communication packets based on transmission characteristics associated with the plurality of devices.

2. The system of claim 1, wherein the plurality of communication paths include data transmission paths between at least two of the plurality of devices and via one or more of a plurality of communication protocols.

3. The system of claim 2, wherein the transmission characteristics include at least one of availability of the first plurality of processing elements and the second plurality of processing elements, and wherein telemetry information is associated with respective ones of the plurality of devices.

4. The system of claim 3, wherein the telemetry information includes at least one of velocity, direction, or location of respective ones of the plurality of devices.

5. The system of claim 2, wherein respective ones of the first plurality of processing elements are associated with one of the plurality of communication protocols.

6. The system of claim 2, wherein the route to re-route the transmitted communication packets includes one or more of the plurality of communication paths between at least two of the plurality of devices via one or more of the plurality of communication protocols.

7. The system of claim 2, wherein the packet module processes a re-route of the communication packets from the source device to the destination device via a path of the route, wherein the path of the route comprises a first one of the plurality of communication protocols from the source device to a first one of the plurality of devices and a second communication protocol between from the first one of the plurality of devices to the destination device, wherein the first one of the plurality of the plurality of devices differs from the source device and the destination device.

8. The system of claim 1, further comprising a machine learning module located within the second plurality of processing elements, wherein the machine learning module is configured to calculate the route to re-route the transmitted communication packets based on historic transmission characteristics associated with the plurality of devices.

9. The system of claim 8, wherein the machine learning module is configured to extrapolate a likelihood of particular transmission characteristics for one or more of the plurality of devices.

10. The system of claim 1, wherein the route to re-route the transmitted communication packets includes transmission of the communication packets from the source device to the destination device by routing the communication packets through one or more control devices, including the control device, communicatively coupled to the source and destination devices.

* * * * *